Jan. 17, 1939.  F. J. BARTHOLOMEW  2,144,251
SLUDGE DECOMPOSITION KILN
Filed Sept. 17, 1938   2 Sheets-Sheet 2

INVENTOR
F. J. BARTHOLOMEW
BY Wm. P. Spielman
ATTORNEY.

Patented Jan. 17, 1939

2,144,251

UNITED STATES PATENT OFFICE 2,144,251

SLUDGE DECOMPOSITION KILN

Frank J. Bartholomew, Westfield, N. J., assignor to Chemical Construction Corporation, New York, N. Y., a corporation of Delaware Application September 17, 1938, Serial No. 230,371

4 Claims. (Cl. 23—279)

This invention relates to apparatus for the thermal decomposition of acid sludges such as are obtained by the sulfuric acid refining of petroleum hydrocarbons or other hydrocarbons containing unsaturates which can be removed by agitation with sulfuric acid. Thermal decomposition of such sludges is resorted to in order to break up the organic sulfates and sulfonic acids which they contain, and preferably to recover sulfur dioxide in a form in which it can be reconverted into sulfuric acid.

The problem of recovering sulfur values from petroleum sludges is one of long standing, but no commercially successful solution to it was developed until 1930, when the Hechenbleikner process was designed. This process was based on the principle of passing the acid sludge through a rotary kiln in countercurrent contact with a stream of heating gases, the kiln temperatures being carefully controlled in a plurality of heating zones. Commercial use has shown that this process is highly successful with acid sludges having a relatively low free hydrocarbon content, but with sludges of higher oil contents the heating gases are so diluted by the additional steps necessary to remove the oil that only a relatively weak $SO_2$ gas is obtained.

In order to render the sludge decomposition process adaptable to high oil sludges, it was found necessary to use hot, non-gaseous material as a heating medium, and preferably hot, finely divided solids. Accordingly, a method was developed in which acid sludges of relatively high oil content were intimately mixed with hot sand or other hot, non-gaseous heating materials in a rotary kiln, the heat of the sand being transferred to the sludge by reason of its intimate admixture therewith and the non-volatile constituents of the sludge being transformed into coke. The details of this process are described in Patents Nos. 2,028,713 to Frank J. Bartholomew and 2,028,725 to James M. Rumple.

In the copending application of Blakeslee Barnes and Nicolay Titlestad, Ser. No. 230,372, filed concurrently herewith, there is described an improvement in the sludge decomposition steps described in the Bartholomew and Rumple patents, which improvement overcomes certain operating difficulties that have been encountered when the process of these patents is applied in large scale manufacture. The invention described and claimed in that application relates in part to certain improvements in the method of operation of the sludge decomposition step whereby difficulties caused by the frothing of an intimate mixture of acid sludge and hot, non-gaseous heating material are avoided. Briefly described, the method of that application consists in establishing a continuous stream of hot granular heating material and depositing acid sludge upon an outer surface of the stream, whereby the sludge is caused to swell and froth away from the heating material instead of being intimately admixed with it.

The present invention relates to an improved type of rotary kiln which is especially adapted for carrying out the steps of the Barnes and Titlestad process just described. While that process can be carried out in other types of apparatus, I have found that the proper rate of admixture between the sludge and the granular heating material can be most readily obtained in a rotary kiln provided with a certain specific type of agitating or mixing means which provides a gradual kneading of the plastic sludge with the granular heating medium. Accordingly, it is an object of the present invention to provide a rotary kiln for thermal decomposition of acid sludges which will mix the sludge with the heating material without causing coalescence of the solid granules thereof. A further object resides in the provision of a rotary kiln having a cylindrical cage provided with laterally extending bars adapted to bring about a gradual mixing of the acid sludge and heating material when the cage is rotated. Still another object resides in the provision of means carried by the rotary cage to prevent the building up of coke deposits thereon.

With the above and other objects in view, the invention consists in the combination and association of parts as will be more definitely pointed out in the detailed description thereof, reference being had to the accompanying drawings.

Figure 1:
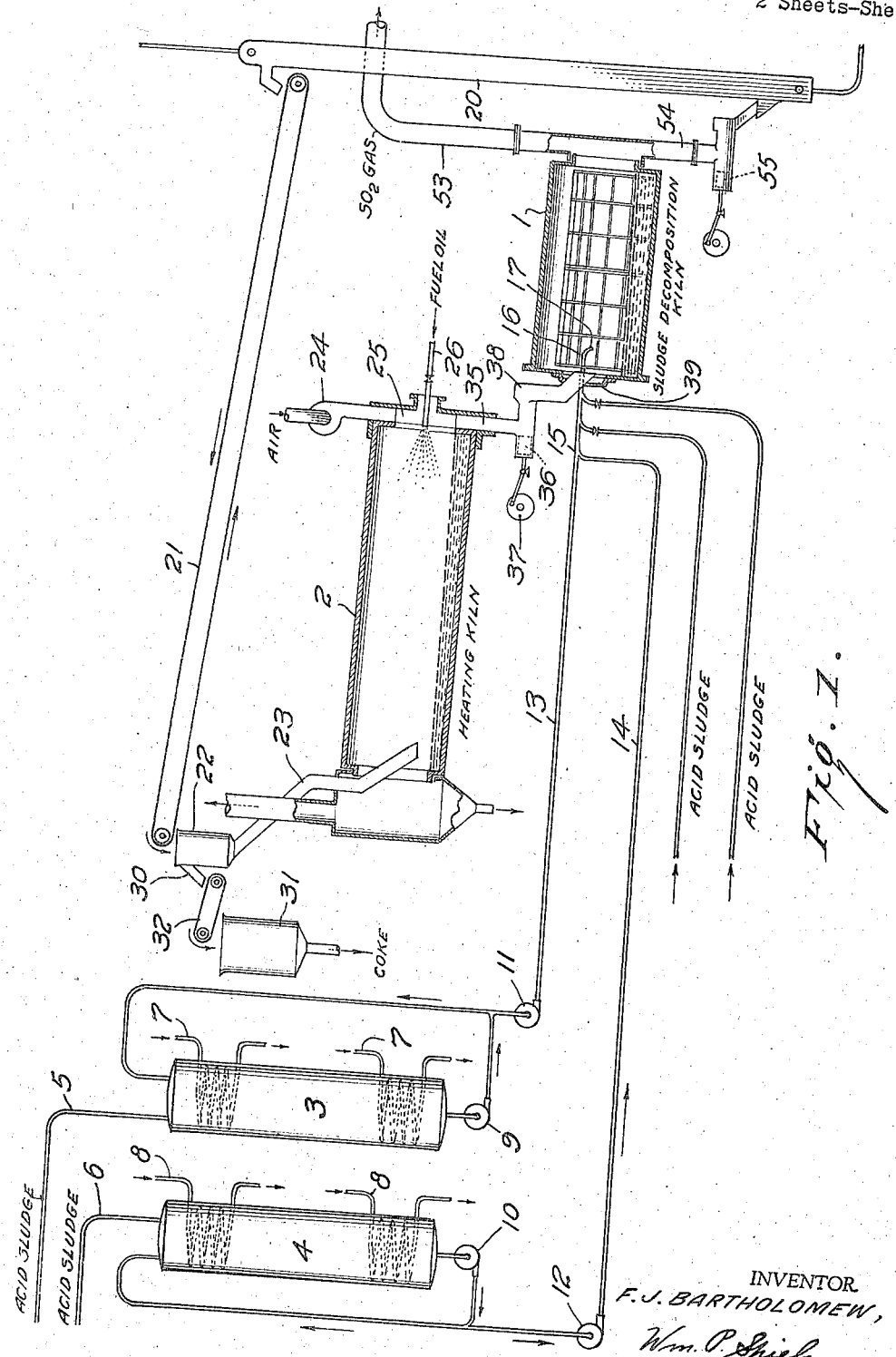
Fig. 1 is a diagrammatic elevation, partly in section, of an acid sludge decomposition plant employing a rotary sludge decomposition kiln illustrated diagrammatically in Fig. 1.

Referring to Fig. 1, the general combination of the apparatus is a part of the Bartholomew and Rumple system referred to above, and constitutes no part of the present invention. It is shown in somewhat diagrammatic form to illustrate one type of commercially successful plant in which the improved sludge decomposition kiln constituting the present invention may be installed with advantage, but it should be understood that the invention in its broader aspects is not limited to this type of plant. The acid sludge decomposition plant illustrated in this figure consists generally of a rotary sludge decomposition kiln 1 constituting an embodiment of the present invention together with a heating kiln 2, sludge preheating and conditioning tanks 3 and 4, and the necessary additional piping and conveyors to complete the process.

The sludge conditioning tanks 3 and 4 are vertical tanks provided with inlet lines 5 and 6, heating coils 7 and 8, and with recirculating pumps 9 and 10 for continuously recirculating acid sludge through the tanks in order to maintain it in fluid condition. It should be understood that acid sludges from various sources have widely differing physical as well as chemical characteristics, but that all such sludges can be heated with steam coils to a degree sufficient to impart fluidity without decomposition. Acid sludge pumps 11 and 12 are provided for preferably continuous withdrawal of sludges from the two recirculating tanks through discharge lines 13 and 14, these lines being joined as at 15 to permit mixing of the sludges just prior to their introduction into the sludge decomposition kiln through a sludge inlet pipe 16 terminating in a nozzle 17 which may be straight or curved as shown. By this means it is possible to obtain a sludge mixture having optimum characteristics for the sludge decomposition process, but additional amounts of the same or different sludges may be introduced, as shown, through additional inlet lines from other recirculating heating tanks similar to the tanks 3 and 4 if desired.

The heating kiln 2 is preferably an elongated rotary kiln in which non-gaseous heating material such as sand, finely divided coke and the like may be preheated to temperatures of about 1500° F. Preferably coke resulting from decomposition of acid sludge is employed as fuel for obtaining high temperatures in the kiln 2, and this coke may be elevated from the sludge decomposition kiln outlet through an elevator 20 and conveyor line 21 to a hopper 22 from which it is fed into the fuel inlet end of the kiln 2 through an inlet pipe 23. Air for combustion is forced into the far end of the kiln by blower 24, preferably through an air inlet 25 which surrounds a gas or fuel oil burner 26 which operates as a pilot burner. The coke may be mixed with a non-gaseous heating medium such as sand or the like, in which case the amount of air introduced through the air inlet 25 is such as to burn out substantially all the coke and heat the sand to the required temperature of about 1500° F. Preferably, however, hot coke from the sludge decomposition kiln is itself used as the heating medium, and in this case the amount of air introduced to the heating kiln is only enough to burn sufficient of the coke to raise the temperature of the entire amount passing through the heating kiln to about 1500° F. In this preferred modification of the process there is generally more coke produced in the sludge decomposition kiln 1 than is necessary for recirculation through the process, and the excess overflows from outlet 30 of the hopper 22 and is discharged into the sludge hopper 31 by conveyor 32. The coke obtained in this manner may be used as fuel for other processes, and it is an advantage of the sludge decomposition kiln constituting the present invention that it improves the quality of the coke so produced by facilitating a more complete removal of available sulfur therefrom.

The granular heating material, which is preferably hot coke, is discharged from the heating kiln 2 through the outlet pipe 35 at temperatures which may range from 1200–1600° F. A feeding mechanism capable of discharging the heated coke at a predetermined rate through a gas tight seal is provided in this pipe, preferably in the form of a plunger feeder 36 operated by a driving mechanism 37. The operation of this plunger feeder introduces a stream of the hot granular coke into the sludge decomposition kiln 1 through the inlet pipe 38, which enters the kiln through a gas tight seal 39. The acid sludge inlet pipe 16 is also passed through this seal, as is shown on Fig. 2 of the drawings.

Figure 2:
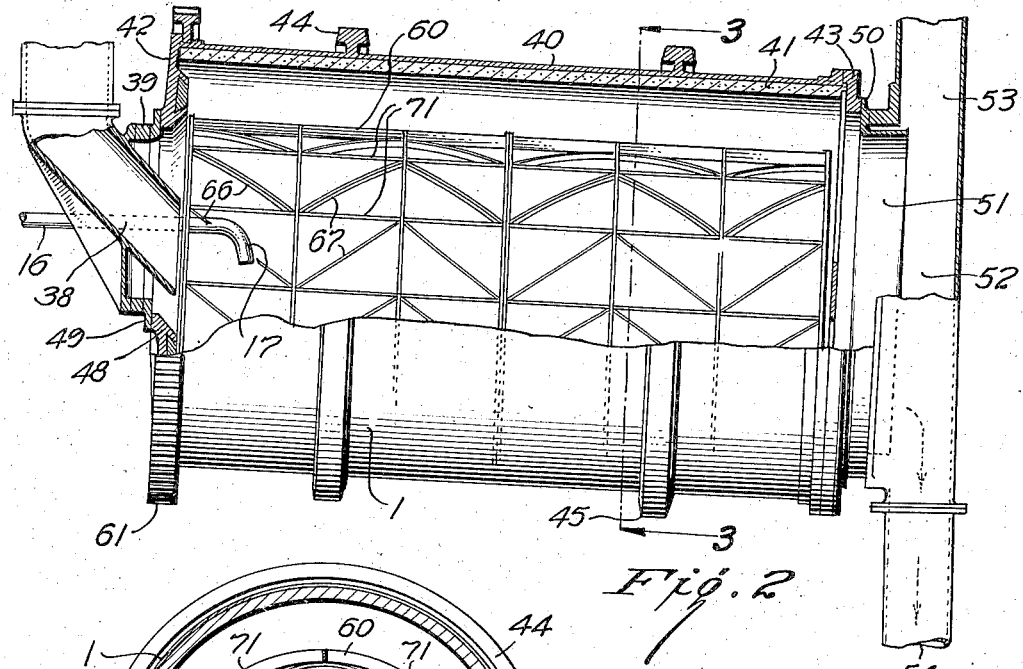
Figure 3:
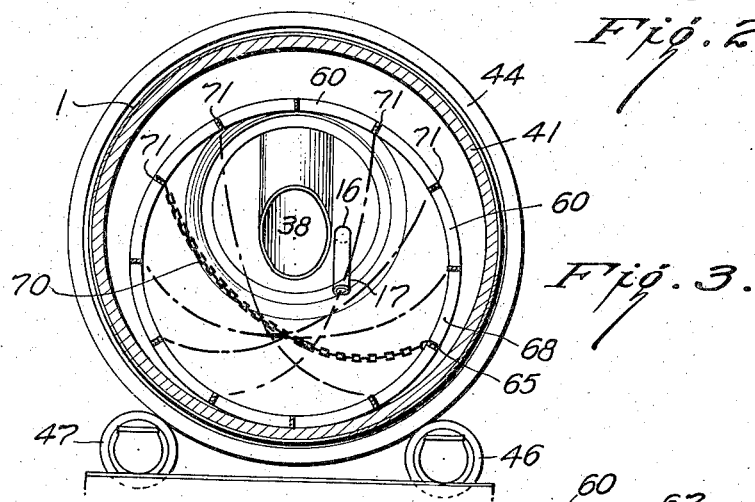
Fig. 3 is a vertical section on the line 3—3 of Fig. 2 looking in the direction of the arrows.

The sludge decomposition kiln which constitutes the subject matter of the present invention is shown in detail in Figs. 2 and 3. Reference to these figures will show that the kiln consists generally of a cylindrical shell 40 provided with an inner lining 41 of ceramic material or the like, an inlet end piece 42 and an outlet end piece 43. The cylindrical shell 40 is provided with annular supporting rails 44 and 45 through which its weight is transmitted to pairs of suitably mounted supporting rollers 46 and 47. The inlet end piece 42 is provided with an outwardly extending annular flange 48, which is adapted to fit against a similar flange 49 on the sealing member 39 and thereby provide a gas tight seal for the inlet end of the kiln. The end piece 43 at the outlet end of the kiln makes sliding contact with a similar flange 50 which forms a part of a stationary outlet nozzle 51, through which the gaseous and solid products from the kiln are passed into an outlet chamber 52. This chamber is provided at its top with a gas outlet line 53 leading to a blower or other suitable suction device, while a pipe 54 at the bottom of the chamber 52 provides a suitable outlet for the granular heating medium which is mixed with the carbonaceous residue from the acid sludge decomposition. This mixture of solids from the kiln is preferably introduced into the elevator 20 by a second plunger feeder 55 which is similar in its construction and operation to the plunger feeder 36.

Figure 4:
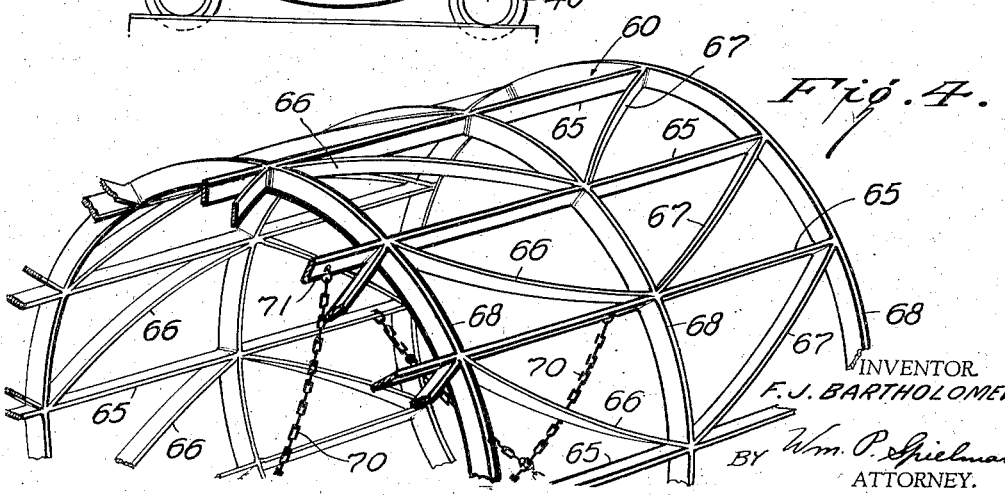
Fig. 4 is a perspective of a part of the cylindrical cage, showing the constructional details thereof.

In accordance with the present invention a cylindrical cage 60 is provided in the sludge decomposition kiln 1 in order to obtain the optimum rate of admixture of the acid sludge with the heating medium. This cage is substantially smaller in diameter than the interior of the kiln in which it is mounted, the difference in diameter being on the order of 12–18 inches. The cage is slightly shorter in length than the internal length of the kiln, and it is therefore free to roll as the kiln is rotated. As is shown in greater detail in Fig. 4, the cage is of a construction especially adapted to provide a gradual kneading of the acid sludge with the granular heating material when frothing or intumescence of the sludge has subsided. To this effect the cage 60 comprises a plurality of laterally extending bars 65, 66 and 67 in its cylindrical surface, these bars being arranged in sets with the different bars of each set placed at varying angles to the direction of rotation of the cage. The bars 65 are preferably normal to the direction of rotation, while the bars 66 and 67 make acute angles with the bars 65. The several sets of bars are preferably connected and strengthened by supporting rings 68 which lie in the direction of rotation of the cage and therefore exert only a small kneading or agitating action on the contents of the kiln.

Since the cylindrical cage 60 extends upwardly in the kiln to a level that is far above the level of the granular heating medium, there is a tendency for it to accumulate deposits of carbonaceous residue from the acid sludge. In order to dislodge such deposits a plurality of loosely hung chains or similar free moving members 70 are provided at intervals across the interior of the cage. These chains are preferably fastened into the bars 65, as shown at 71 on Fig. 3, and are provided with sufficient slack so that they will contact and beat against all the laterally extending bars as the cage is rotated but without dropping below the outer periphery of the cage. The provision of cleaning members of this type constitutes another important feature of the invention.

The operation of my improved kiln will be clear from the foregoing description. The kiln is rotated by means of a gear, not shown, which meshes with the annular gear 61 that is attached to the outer shell 40 of the kiln. A stream of hot, granular heating material such as finely divided coke heated to about 1500° F. is introduced through the inlet pipe 38 and is maintained in a relatively deep bed in the bottom of the kiln. Acid sludge from the pipe 16 is deposited upon the stream of hot coke through the nozzle 17, whereupon it immediately swells up and froths in the inlet end of the kiln by reason of its content of organic sulfates and other unstable or volatile constituents. The acid sludge remains in this swollen and plastic condition for a substantial period of time, and during this time the kiln is slowly rotated and the sets of laterally extending bars 65, 66 and 67 are passed slowly through the froth and break it up so that its content of gases is more readily evolved. The movement of the bars as the cage is rotated is such that they cut downwardly through the froth in the inlet end of the kiln and through the layer of finely divided coke beneath it without producing an intimate mixture of the two materials. Further along towards the middle and outlet end of the kiln the acid sludge has evolved most of its gaseous constituents, has passed through the plastic stage and has finally reached a solid or semi-solid consistency. In these portions of the kiln, the laterally extending bars do not cut through the now carbonized sludge so readily and a more intimate mixture of the hot coke and carbonaceous residue is obtained. This is increasingly intimate mixture results in a complete evolution of the remainder of the volatile constituents of the sludge, and produces a carbonaceous residue having a low sulfur content. As the carbonaceous residue hardens under this heat treatment the admixture caused by the laterally extending bars of the cage is finally completed until a homogeneous mixture of heating medium and carbonaceous residue from the sludge is discharged from the outlet end of the kiln. From this point it passes through the outlet pipe 54 and is discharged by way of the elevator 20 and conveyor 21 into the hopper 22, from which a portion of it is fed into the heating kiln 2 to repeat the heating and sludge decomposition cycle.

From the foregoing description it will be seen that I have described and shown a modification of the invention which accomplishes all of the objects thereof. It should be understood, however, that the invention in its broader aspects is not limited to this specific modification, but that alterations and substitutions of equivalents may be resorted to within the scope of the claims appended hereto.

What I claim is:

1. Apparatus for thermal decomposition of acid sludges which intumesce and become plastic upon heating which comprises in combination a rotary kiln, means for feeding acid sludge into said kiln, means for introducing a hot granular heating material into said kiln, and a cylindrical cage in said kiln which is substantially smaller in diameter than the interior of the kiln and is free to roll therein as the kiln is rotated, said cage having in its cylindrical surface a plurality of laterally extending bars adapted to bring about a gradual mixing of the acid sludge and heating material when the kiln is rotated.

2. Apparatus for thermal decomposition of acid sludges which intumesce and become plastic upon heating which comprises in combination a rotary kiln, means for feeding acid sludge into said kiln, means for introducing a hot granular heating material into said kiln, and a cylindrical cage in said kiln which is substantially smaller in diameter than the interior of the kiln and is free to roll therein as the kiln is rotated, said cage having in its cylindrical surface a plurality of laterally extending bars adapted to bring about a gradual mixing of the acid sludge and heating material when the kiln is rotated and a plurality of chains loosely hung across its interior to dislodge carbon deposits therefrom.

3. Apparatus for thermal decomposition of acid sludges which intumesce and become plastic upon heating which comprises in combination a slightly inclined rotary kiln, means for introducing a stream of hot granular heating material into the upper end of said kiln, means for depositing acid sludge upon said stream of granular heating material in the upper end of said kiln, and a cylindrical cage in said kiln which is substantially smaller in diameter than the interior of the kiln and is free to roll therein as the kiln is rotated, said cage having in its cylindrical surface a plurality of laterally extending bars adapted to bring about a gradual mixing of the heating material with the acid sludge at such a rate that an intimate mixture is obtained only after intumescence of the acid sludge has subsided.

4. Apparatus for thermal decomposition of acid sludges which intumesce and become plastic upon heating which comprises in combination a slightly inclined rotary kiln, means for introducing a stream of hot granular heating material into the upper end of said kiln, means for depositing acid sludge upon said stream of granular heating material in the upper end of said kiln, and a cylindrical cage in said kiln which is substantially smaller in diameter than the interior of the kiln and is free to roll therein as the kiln is rotated, said cage having in its cylindrical surface a plurality of laterally extending bars adapted to bring about a gradual mixing of the heating material with the acid sludge at such a rate that an intimate mixture is obtained only after intumescence of the acid sludge has subsided, and a plurality of chains loosely hung across the interior of said cage to dislodge carbon deposits therefrom.

FRANK J. BARTHOLOMEW.